United States Patent
Kurokawa

(10) Patent No.: US 10,148,193 B2
(45) Date of Patent: Dec. 4, 2018

(54) POWER SUPPLY UNIT AND STATIC ELIMINATOR

(71) Applicant: Murata Manufacturing Co., Ltd., Nagaokakyo-shi, Kyoto-fu (JP)

(72) Inventor: Takashi Kurokawa, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/810,200

(22) Filed: Nov. 13, 2017

(65) Prior Publication Data

US 2018/0069484 A1  Mar. 8, 2018

Related U.S. Application Data

(63) Continuation of application No. PCT/JP2016/061346, filed on Apr. 7, 2016.

(30) Foreign Application Priority Data

May 26, 2015  (JP) .................................. 2015-106263

(51) Int. Cl.
   *H02M 7/06*   (2006.01)
   *H01T 23/00*  (2006.01)
   *H05F 3/04*   (2006.01)

(52) U.S. Cl.
   CPC ............ *H02M 7/062* (2013.01); *H01T 23/00* (2013.01); *H05F 3/04* (2013.01)

(58) Field of Classification Search
   CPC ........ H02M 1/32; H02M 1/088; H02M 1/081; H02M 1/4208; H02M 7/00; H02M 7/06;

(Continued)

(56) References Cited

U.S. PATENT DOCUMENTS 3,723,850 A * 3/1973 Daniels ................... H02M 7/06
                                                363/126
3,819,980 A * 6/1974 Mullersman ............. H02J 9/02
                                                307/66

(Continued)

FOREIGN PATENT DOCUMENTS

JP   04-368466 A   12/1992
JP   05-031200 U    4/1993

(Continued)

OTHER PUBLICATIONS

Official Communication issued in International Patent Application No. PCT/JP2016/061346, dated Jul. 5, 2016.

(Continued)

*Primary Examiner* — Adolf Berhane
(74) *Attorney, Agent, or Firm* — Keating & Bennett, LLP

(57) ABSTRACT

A power supply unit includes a transformer including a primary winding that receives an alternating-current voltage and a secondary winding including a first end electrically connected to ground, a positive-side rectification circuit including a diode electrically connected to a second end of the secondary winding, an anode of which is electrically connected to the second end, and a cathode of which is electrically connected to a positive-side output terminal, a negative-side rectification circuit including a diode electrically connected to the second end of the secondary winding, a cathode of which is electrically connected to the second end, and an anode of which is electrically connected to a negative-side output terminal, and a capacitor provided on a path from a node between the second end of the secondary winding and the positive-side rectification circuit and the negative-side rectification circuit to the ground through the secondary winding.

19 Claims, 14 Drawing Sheets

(58) Field of Classification Search
CPC .......... H02M 7/08; H02M 7/10; H02M 7/062; H02M 7/217
USPC .......... 363/52, 53, 67, 69, 84, 125, 126, 127
See application file for complete search history.

(56) References Cited

U.S. PATENT DOCUMENTS

| | | | | |
|---|---|---|---|---|
| 4,158,881 A | * | 6/1979 | Simmons | H02M 3/3376 363/25 |
| 4,673,888 A | * | 6/1987 | Engelmann | H03F 1/0227 323/301 |
| 4,819,145 A | * | 4/1989 | Maeba | G03G 15/065 363/126 |
| 2001/0036091 A1 | * | 11/2001 | Yasumura | H02M 3/3385 363/21.02 |
| 2004/0196671 A1 | * | 10/2004 | Yasumura | H02M 3/3385 363/19 |
| 2009/0231883 A1 | * | 9/2009 | Osaka | H02M 3/155 363/15 |
| 2010/0226155 A1 | * | 9/2010 | Hanington | H02M 7/106 363/125 |
| 2012/0056580 A1 | * | 3/2012 | Kai | H02J 5/005 320/108 |
| 2013/0141947 A1 | * | 6/2013 | Sakurai | H02M 3/33523 363/21.16 |

FOREIGN PATENT DOCUMENTS

| | | |
|---|---|---|
| JP | 10-191549 A | 7/1998 |
| JP | 2000-058290 A | 2/2000 |
| JP | 2007-027015 A | 2/2007 |
| JP | 2007-087932 A | 4/2007 |
| JP | 2008-016274 A | 1/2008 |
| JP | 4367580 B2 | 11/2009 |
| JP | 2010-129499 A | 6/2010 |
| JP | 2010-218750 A | 9/2010 |
| JP | 2010-257756 A | 11/2010 |
| JP | 2013-116026 A | 6/2013 |

OTHER PUBLICATIONS

Official Communication issued in Korean Patent Application No. 10-2017-7031359, dated Aug. 31, 2018.

* cited by examiner

POWER SUPPLY UNIT AND STATIC ELIMINATOR

CROSS REFERENCE TO RELATED APPLICATIONS

This application claims the benefit of priority to Japanese Patent Application No. 2015-106263 filed on May 26, 2015 and is a Continuation Application of PCT Application No. PCT/JP2016/061346 filed on Apr. 7, 2016. The entire contents of each application are hereby incorporated herein by reference.

BACKGROUND OF THE INVENTION

1. Field of the Invention

The present invention relates to a power supply unit that outputs positive current and negative current in a balanced or substantially balanced manner and a static eliminator including the power supply unit.

2. Description of the Related Art

Static eliminators include, for example, a static eliminator that applies a method of concentrating an electric field on a needle discharge electrode to generate positive and negative ions and eliminating the static electricity with ionized air. Since an object is charged if the amount of generation of the ions is biased toward the positive or negative ions in the case of the static eliminator applying this method, it is desired to generate the positive and negative ions from the static eliminator in a balanced manner.

Japanese Patent Application No. 4367580 discloses a static eliminator that generates the positive and negative ions in a balanced manner. The static eliminator described in Japanese Patent Application No. 4367580 increases supply voltage and applies the supply voltage to the electrode to generate positive and negative ions. In the generation of positive and negative ions, the static eliminator detects the difference between the amounts of the positive and negative ions generated from the electrode to control the supply voltage so that the amount of the positive ions generated from the electrode is equal to the amount of the negative ions generated from the electrode based on the result of the detection.

However, in Japanese Patent Application No. 4367580, since feedback control is performed so as to keep the balance of generation of the positive and negative ions, there is a problem in that the control and the circuit configuration are complicated. In addition, since it is necessary to provide two output circuits in order to control positive voltage and negative voltage, there is a problem in that the static eliminator involves a significant cost and is increased in size.

SUMMARY OF THE INVENTION

Preferred embodiments of the present invention provide power supply units that output positive current and negative current in a balanced or substantially balanced manner with simple circuitry, and static eliminators including the power supply units.

A power supply unit according to a preferred embodiment of the present invention includes an alternating-current voltage input, a transformer including a primary winding and a secondary winding, the primary winding being electrically connected to the alternating-current voltage input, a first end of the secondary winding being electrically connected to ground, a first rectification circuit including a first diode which is electrically connected to a second end of the secondary winding, an anode of which is electrically connected to the second end, and a cathode of which is electrically connected to a positive-side output terminal, a second rectification circuit including a second diode which is electrically connected to the second end of the secondary winding, a cathode of which is electrically connected to the second end, and an anode of which is electrically connected to a negative-side output terminal, and a capacitor provided on a path extending from a node between the second end of the secondary winding and the first rectification circuit and the second rectification circuit to the ground through the secondary winding.

Accordingly, the positive and negative voltage peak values at the secondary side of the transformer are varied due to the capacitor electrically connected to the secondary winding, and thus the total amount of current output from the positive-side output terminal is able to be equal or substantially equal to the total amount of current output from the negative-side output terminal. As a result, since it is not necessary to perform the feedback control and so on, positive current and negative current are able to be balanced or substantially balanced with one another with simple circuitry.

According to a preferred embodiment of the present invention, the capacitor may be provided between the secondary winding and the ground.

According to a preferred embodiment of the present invention, the capacitor may be provided between the node and the secondary winding.

A power supply unit according to a preferred embodiment of the present invention may include a first resistive voltage divider circuit electrically connected in parallel to the capacitor.

Accordingly, the voltage of the capacitor is able to be detected with the resistive voltage divider. As a result, the output voltage is able to be monitored and any abnormal condition of the power supply unit is able to be detected.

The first rectification circuit may include a first smoothing capacitor electrically connected between the cathode of the first diode and the ground, and the second rectification circuit may include a second smoothing capacitor electrically connected between the anode of the second diode and the ground.

Accordingly, the output voltage is able to be detected with the resistive voltage divider. The output voltage is able to be monitored and any abnormal condition of the power supply unit is able to be detected.

A power supply unit according to a preferred embodiment of the present invention may include a second resistive voltage divider circuit electrically connected in parallel to the first smoothing capacitor and a third resistive voltage divider circuit electrically connected in parallel to the second smoothing capacitor.

Accordingly, the output voltage is able to be detected with the resistive voltage divider. The output voltage is able to be monitored and any abnormal condition of the power supply unit is able to be detected.

The transformer may include a tertiary winding. The power supply unit may further include a detection circuit that detects voltage occurring at the tertiary winding.

Accordingly, the voltage occurring at the secondary side of the transformer is able to be detected. The output voltage is able to be monitored and any abnormal condition of the power supply unit is able to be detected.

In a power supply unit according to a preferred embodiment of the present invention, the first rectification circuit may include multiple first rectification circuits, the second rectification circuit may include multiple second rectification circuits, the positive-side output terminal may include multiple positive-side output terminals, and the negative-side output terminal may include multiple negative-side output terminals. The transformer may include multiple secondary windings. The second end of each of the multiple secondary windings may be electrically connected to the positive-side output terminal and the negative-side output terminal via the first rectification circuit and the second rectification circuit.

Accordingly, the output voltage is able to be shared between the multiple secondary windings to significantly reduce withstanding voltage performance of each secondary winding.

A power supply unit according to a preferred embodiment of the present invention includes a first positive and negative output circuit and a second positive and negative output circuit. Each of the first positive and negative output circuit and the second positive and negative output circuit includes a positive-side output terminal and a negative-side output terminal, a transformer including a primary winding that receives an alternating-current voltage and a secondary winding including a first end that is electrically connected to ground, a first rectification circuit including a first diode which is electrically connected to a second end of the secondary winding, an anode of which is electrically connected to the second end, and a cathode of which is electrically connected to the positive-side output terminal, a second rectification circuit including a second diode which is electrically connected to the second end of the secondary winding, a cathode of which is electrically connected to the second end, and an anode of which is electrically connected to the negative-side output terminal, and a capacitor provided on a path from a node between the second end of the secondary winding and the first rectification circuit and the second rectification circuit to the ground through the secondary winding. The positive-side output terminal of the first positive and negative output circuit is electrically connected to the negative-side output terminal of the second positive and negative output circuit via a first resistor and a second resistor. The negative-side output terminal of the first positive and negative output circuit is electrically connected to the positive-side output terminal of the second positive and negative output circuit via a third resistor and a fourth resistor. A node between the first resistor and the second resistor is electrically connected to a first positive and negative output terminal. A node between the third resistor and the fourth resistor is electrically connected to a second positive and negative output terminal.

Accordingly, alternately operating the first positive and negative output circuit and the second positive and negative output circuit provides a positive current and a negative current that are alternately output from the first positive and negative output circuit and the second positive and negative output circuit in a balanced or substantially balanced manner. In other words, both the positive current and the negative current are able to be output from one terminal (the first positive and negative output terminal or the second positive and negative output terminal).

A static eliminator according to a preferred embodiment of the present invention includes a power supply unit according to a preferred embodiment of the present invention, a positive ion generator electrically connected to the positive-side output terminal, and a negative ion generator electrically connected to the negative-side output terminal.

Accordingly, since the current flowing into the positive ion generator is equal or substantially equal to the current flowing into the negative ion generator, the static eliminator is able to provide a desirable balance of generation of the positive and negative ions.

A static eliminator according to a preferred embodiment of the present invention includes the power supply unit of the present invention and ion generators electrically connected to the first positive and negative output terminal and the second positive and negative output terminal.

Accordingly, the positive and negative ions are able to be alternately generated from one ion generator. If the positive ions are constantly or substantially constantly discharged from a single ion generator, there is a problem in that the balance of the ions is disturbed near the ion element. In addition, there is a problem in that the ion generator is abraded due to collision of molecules in the positive ion generator. If the negative ions are constantly or substantially constantly discharged from a single ion generator, there is also a problem in that siloxane adheres to the ion generator. Accordingly, alternately generating the positive and negative ions from the ion generator resolves the problems described above, thus providing a significant improvement of the balance of the ions near the ion element and an increase of the lifetime of the ion generator.

According to preferred embodiments of the present invention, since it is not necessary to perform the feedback control and so on, the positive current and the negative current are able to be balanced or substantially balanced with one another with simple circuitry. In addition, since it is not necessary to feedback-control the positive voltage and the negative voltage, the cost and the size are able to be significantly reduced. Furthermore, the connection of the positive ion generator and the negative ion generator to the positive-side output terminal and the negative-side output terminal provides a static eliminator with an excellent balance of generation of the positive and negative ions.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
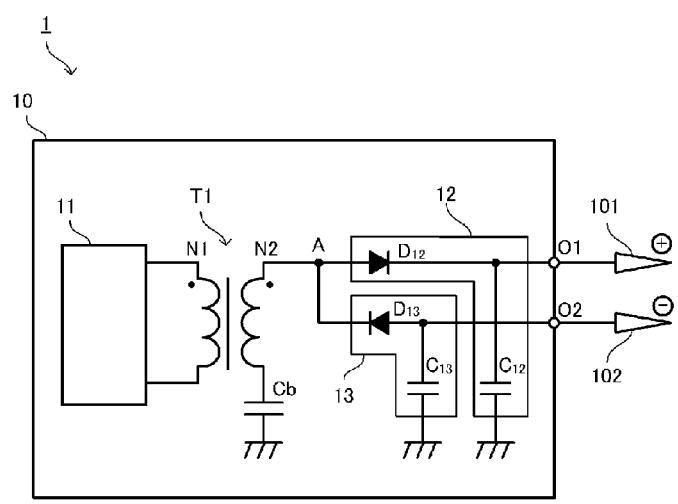
FIG. 1 is a circuit diagram of a static eliminator according to a first preferred embodiment of the present invention.

FIG. 1 is a circuit diagram of a static eliminator 1 according to a first preferred embodiment of the present invention.

The static eliminator 1 includes a power supply unit 10, a positive ion generator 101, and a negative ion generator 102. The power supply unit 10 includes a positive-side output terminal O1 and a negative-side output terminal O2. The power supply unit 10 outputs positive high voltage (hereinafter referred to as positive voltage) from the positive-side output terminal O1 and outputs negative high voltage (hereinafter referred to as negative voltage) from the negative-side output terminal O2. The positive-side output terminal O1 is an example of a "positive-side output terminal". The negative-side output terminal O2 is an example of a "negative-side output terminal".

The positive ion generator 101 is electrically connected to the positive-side output terminal O1. The negative ion generator 102 is electrically connected to the negative-side output terminal O2. Each of the positive ion generator 101 and the negative ion generator 102 preferably is a needle discharge electrode. Upon application of the positive voltage to the needle discharge electrode at the positive side and application of the negative voltage to the needle discharge electrode at the negative side by the power supply unit 10, corona discharge occurs at the needle discharge electrode and the air is ionized to generate positive ions and negative ions.

The power supply unit 10 includes a driving circuit 11, a transformer T1, a positive-side rectification circuit 12, and a negative-side rectification circuit 13.

The transformer T1 includes a primary winding N1 and a secondary winding N2. The primary winding N1 is electrically connected to the driving circuit 11. The driving circuit 11 supplies alternating-current voltage to the primary winding N1 of the transformer T1. Upon application of the alternating-current voltage to the primary winding N1 of the transformer T1, alternating-current voltage with turn ratio times higher than that of the alternating-current voltage applied to the primary winding N1 occurs at the secondary winding N2 of the transformer T1. The alternating-current voltage to be applied to the primary winding N1 is hereinafter referred to as an "input voltage".

A first end of the secondary winding N2 of the transformer T1 is electrically connected to ground with a bypass capacitor Cb disposed therebetween. The positive-side rectification circuit 12 and the negative-side rectification circuit 13 are electrically connected to a second end of the secondary winding N2. The positive-side rectification circuit 12 is electrically connected to the positive-side output terminal O1 and the negative-side rectification circuit 13 is electrically connected to the negative-side output terminal O2. A node between the second end of the secondary winding N2 and the positive-side rectification circuit 12 and the negative-side rectification circuit 13 is referred to as a "node A" in the following description.

The positive-side rectification circuit 12 includes a diode $D_{12}$ and a smoothing capacitor $C_{12}$. The anode of the diode $D_{12}$ is electrically connected to the second end of the secondary winding N2 and the cathode thereof is electrically connected to the positive-side output terminal O1. The smoothing capacitor $C_{12}$ is electrically connected between the cathode of the diode $D_{12}$ and the ground.

The positive-side rectification circuit 12 is an example of a "first rectification circuit". The diode $D_{12}$ is an example of a "first diode". The smoothing capacitor $C_{12}$ is an example of a "first smoothing capacitor". The positive-side rectification circuit 12 may not include the smoothing capacitor $C_{12}$.

The negative-side rectification circuit 13 includes a diode $D_{13}$ and a smoothing capacitor $C_{13}$. The cathode of the diode $D_{13}$ is electrically connected to the second end of the secondary winding N2 and the anode thereof is electrically connected to the negative-side output terminal O2. The smoothing capacitor $C_{13}$ is electrically connected between the anode of the diode $D_{13}$ and the ground.

The negative-side rectification circuit 13 is an example of a "second rectification circuit". The diode $D_{13}$ is an example of a "second diode". The smoothing capacitor $C_{13}$ is an example of a "second smoothing capacitor". The negative-side rectification circuit 13 may not include the smoothing capacitor $C_{13}$.

Preferably, the static eliminator 1 adjusts the balance of generation of the positive and negative ions in order to eliminate the static electricity from an object without biasing toward the positive voltage or the negative voltage. In order to provide the static eliminator 1 with a desirable balance of generation of the positive and negative ions, the absolute value of current (hereinafter referred to as positive current) flowing into the positive ion generator 101 is equal or substantially equal to the absolute value of current (hereinafter referred to as negative current) flowing into the negative ion generator 102. Then, the amount of the positive ions generated in the positive ion generator 101 is equal or substantially equal to the amount of the negative ions generated in the negative ion generator 102. In the present preferred embodiment, the bypass capacitor Cb sets the absolute values of the positive current and the negative current to be equal or substantially equal to each other. The bypass capacitor Cb setting the absolute values of the positive current equal or substantially equal to the absolute value of the negative current is described below.

Figure 2A:
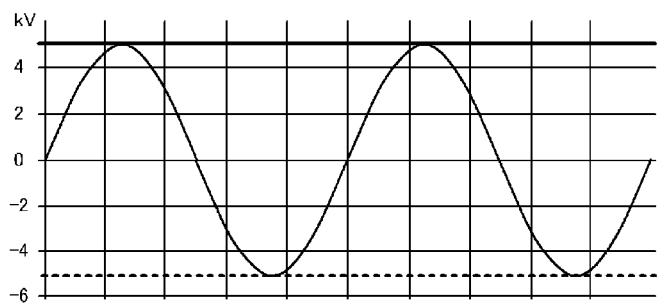
FIG. 2A is a graph illustrating the waveform of alternating-current voltage at a node A immediately after sine-wave alternating current input voltage is applied to a primary winding, the waveform of voltage to be applied to a positive ion generator, and the waveform of voltage to be applied to a negative ion generator.
Figure 2B:
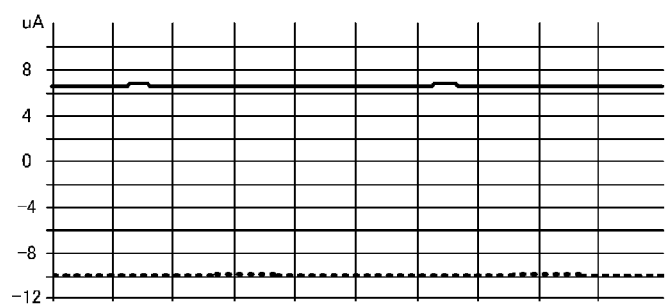
FIG. 2B is a graph illustrating the waveform of current flowing through the positive ion generator and the waveform of current flowing through the negative ion generator.
Figure 2C:
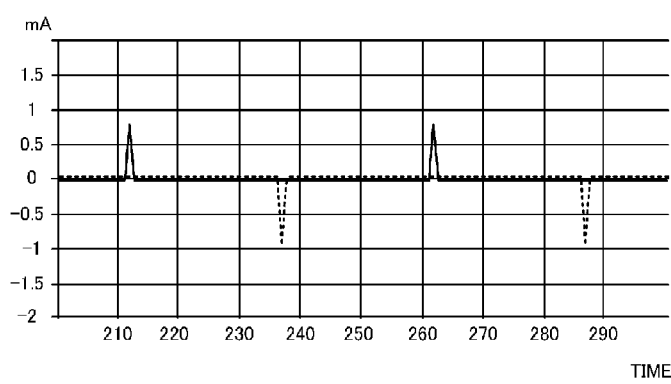
FIG. 2C is a graph illustrating the waveform of current flowing through a positive-side rectification circuit and the waveform of current flowing through a negative-side rectification circuit.

FIG. 2A is a graph illustrating the waveform of alternating-current voltage at the node A immediately after sine-wave alternating current input voltage is applied to the primary winding N1, the waveform of voltage to be applied to the positive ion generator 101, and the waveform of voltage to be applied to the negative ion generator 102. FIG. 2B is a graph illustrating the waveform of current flowing through the positive ion generator 101 and the waveform of current flowing through the negative ion generator 102. FIG. 2C is a graph illustrating the waveform of current flowing through the positive-side rectification circuit 12 and the waveform of current flowing through the negative-side rectification circuit 13.

Referring to FIG. 2A, a solid-line waveform indicates the voltage to be applied to the positive ion generator 101 and a dotted-line waveform indicates the voltage to be applied to the negative ion generator 102. Referring to FIG. 2B, a solid-line waveform is the waveform of the current flowing into the positive ion generator 101 and a dotted-line waveform is the waveform of the current flowing into the negative ion generator 102. Referring to FIG. 2C, a solid-line waveform indicates the current flowing into the positive-side rectification circuit 12 and a dotted-line waveform indicates the current flowing into the negative-side rectification circuit 13.

If the bypass capacitor Cb is not charged, upon application of the sine-wave alternating current voltage to the primary winding N1, the voltage between both ends of the bypass capacitor Cb is equal or substantially equal to zero. Accordingly, as illustrated in FIG. 2A, the absolute value of a positive voltage peak value (the solid-line waveform) of the sine-wave alternating current voltage occurring at the node A is equal or substantially equal to the absolute value of a negative voltage peak value (the dotted-line waveform) thereof. Positive voltage equal or substantially equal to the positive voltage peak value at the node A is applied to the positive ion generator via the positive-side rectification circuit 12. Negative voltage equal or substantially equal to the negative voltage peak value at the node A is applied to the negative ion generator via the negative-side rectification circuit 13.

Positive corona discharge occurs at the positive ion generator 101 in accordance with the positive voltage applied to the positive ion generator 101 and the easiness of generation of the ions in the positive ion generator 101 to generate the positive ions. Positive ion current equal or substantially equal to the amount of charge of the generated positive ions flows through the positive ion generator. In addition, negative corona discharge occurs at the negative ion generator 102 in accordance with the negative voltage applied to the negative ion generator 102 and the easiness of generation of the ions in the negative ion generator 102 to generate the negative ions. Negative ion current equal or substantially equal to the amount of charge of the generated negative ions flows through the negative ion generator.

For example, if the negative ions are likely to be generated, compared with the positive ions, the absolute value of the current generated in the negative ion generator (the amount of negative ions) is greater than the absolute value of the current generated in the positive ion generator (the amount of positive ions), as shown in FIG. 2B. The current generated in the ion generators is supplied from the secondary winding N2 of the transformer T1 as pulse current flowing into and out of the positive-side rectification circuit 12 and pulse current flowing into and out of the negative-side rectification circuit 13, which are shown in FIG. 2C. In this case, the absolute value of the negative pulse current is greater than the absolute value of the positive pulse current. In light of this, in order to set the amount of positive ions to be equal or substantially equal to the amount of negative ions, the positive voltage peak value and the negative voltage peak value are varied to set the sum (difference) of the value of the current flowing from the node A to the positive-side rectification circuit 12 and the value of the current flowing from the node A to the negative-side rectification circuit 13 to zero.

A state will now be described in which the operation of the circuit is continued in the state in which the negative ions are likely to be generated, compared with the positive ions.

Figure 3A:
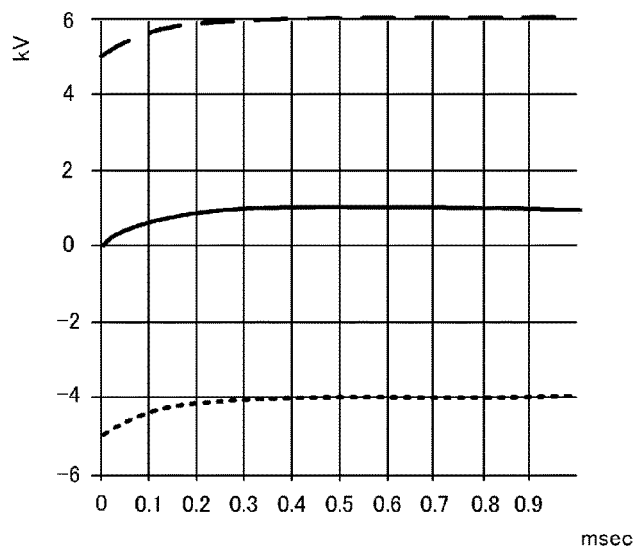
FIG. 3A is a graph illustrating the waveform of voltage to be applied to the positive ion generator, the waveform of voltage to be applied to the negative ion generator, and the waveform of voltage at a bypass capacitor
Figure 3B:
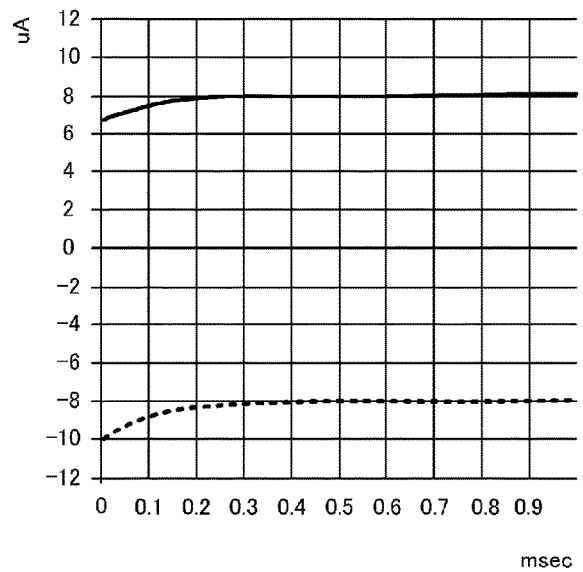
FIG. 3B is a graph illustrating the waveform of current flowing into the positive ion generator and the waveform of current flowing into the negative ion generator, from an initial state to a steady state.

FIG. 3A is a graph illustrating the waveform of voltage to be applied to the positive ion generator 101, the waveform of voltage to be applied to the negative ion generator 102, and the waveform of voltage at the bypass capacitor and FIG. 3B is a graph illustrating the waveform of current flowing into the positive ion generator 101 and the waveform of current flowing into the negative ion generator 102, from an initial state to a steady state.

Referring to FIG. 3A, a solid-line waveform is the waveform of the voltage at the bypass capacitor Cb, a broken-line waveform is the waveform of the voltage to be applied to the positive ion generator 101, and a dotted-line waveform is the waveform of the voltage to be applied to the negative ion generator 102. Referring to FIG. 3B, a solid-line waveform is the waveform of the current flowing into the positive ion generator 101 and a dotted-line waveform is the waveform of the current flowing into the negative ion generator 102.

The total amount of the charge flowing between the node A and the positive-side rectification circuit 12 and the negative-side rectification circuit 13 is supplied through charge and discharge of the bypass capacitor Cb via the secondary winding N2 of the transformer T1. Here, the voltage between both ends of the bypass capacitor Cb is varied to establish V=Q (the total amount of charge)/C (the capacitance of the capacitor) depending on the amount of charge flowing into and out of the bypass capacitor Cb.

Since the total amount of the current flowing from the node A into the positive-side rectification circuit 12 and the negative-side rectification circuit 13 is negative current in the initial state, the voltage of the bypass capacitor Cb is increased by an amount corresponding to the amount of supply of the negative current (the negative charge). In response to the increase in the voltage of the bypass capacitor Cb, the positive voltage peak value at the node A is also increased, the negative voltage peak value is decreased, the amount of generation of the positive ions is increased, and the amount of generation of the negative ions is decreased.

Accordingly, as shown in FIG. 3A, the increase in the voltage of the bypass capacitor Cb and the application of the voltage to the positive ion generator 101 and the negative ion generator 102 are continued until the difference between the positive current and the negative current (the difference between the amounts of generation of the positive and negative ions) disappears and, if the difference between the positive current and the negative current disappears, the flowing of the current into the bypass capacitor Cb and the variation in the voltage of the capacitor also disappear.

Figure 4A:
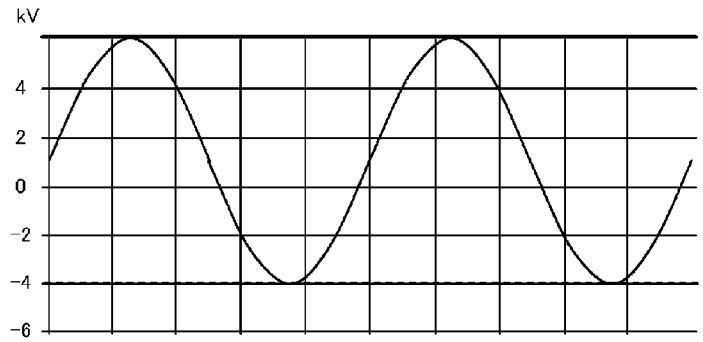
FIG. 4A is a graph illustrating the waveform of alternating-current voltage at the node A immediately after the sine-wave alternating current input voltage is applied to the primary winding, the waveform of voltage to be applied to the positive ion generator, and the waveform of voltage to be applied to the negative ion generator.
Figure 4B:
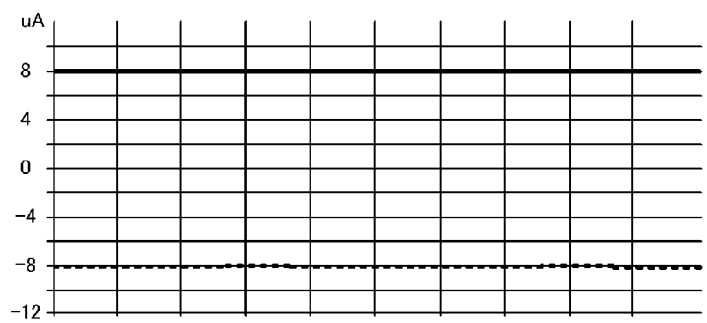
FIG. 4B is a graph illustrating the waveform of current flowing into the positive ion generator and the waveform of current flowing into the negative ion generator.
Figure 4C:
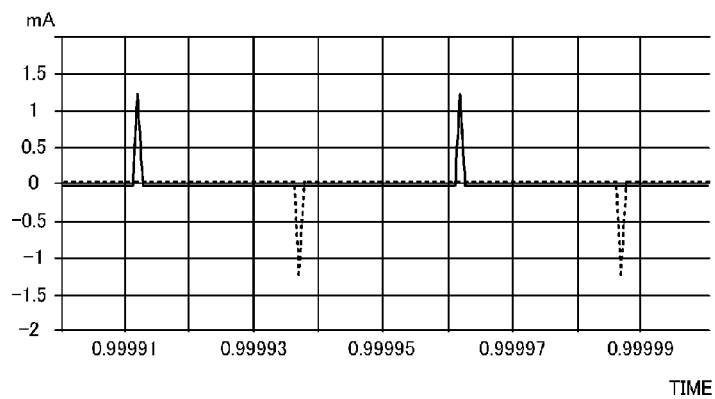
FIG. 4C is a graph illustrating the waveform of current flowing into the positive-side rectification circuit and the waveform of current flowing into the negative-side rectification circuit, in the steady state.

FIG. 4A is a graph illustrating the waveform of alternating-current voltage at the node A immediately after the sine-wave alternating current input voltage is applied to the primary winding N1, the waveform of voltage to be applied to the positive ion generator 101, and the waveform of voltage to be applied to the negative ion generator 102, FIG. 4B is a graph illustrating the waveform of current flowing into the positive ion generator 101 and the waveform of current flowing into the negative ion generator 102, and FIG. 4C is a graph illustrating the waveform of current flowing into the positive-side rectification circuit 12 and the waveform of current flowing into the negative-side rectification circuit 13, in the steady state. FIGS. 4A to 4C indicate that the waveform of the voltage at the node A is shifted toward the positive side, the absolute value of the current flowing through the positive ion generator 101 is equal or substantially equal to the absolute value of the current flowing through and the negative ion generator 102, and the absolute value of the current flowing through the positive-side rectification circuit 12 is equal or substantially equal to the absolute value of the current flowing through the negative-side rectification circuit 13.

As described above, the bypass capacitor Cb sets the amount of the positive ions generated in the positive ion generator 101 to be equal or substantially equal to the amount of the negative ions generated in the negative ion generator 102 to provide the static eliminator 1 with a desirable balance of generation of the positive and negative ions.

In addition, since only the bypass capacitor Cb maintains the balance of generation of the positive and negative ions in the static eliminator 1 in the present preferred embodiment, it is not necessary to perform the detection of the amounts of the positive and negative ions or the detection of the ion current and the feedback control according to the detection of the amounts of the positive and negative ions or the detection of the ion current. Accordingly, it is not necessary to provide a feedback control circuit to significantly reduce the manufacturing cost and decrease the number of components, thus significantly reducing the cost and the size.

Figure 5A:
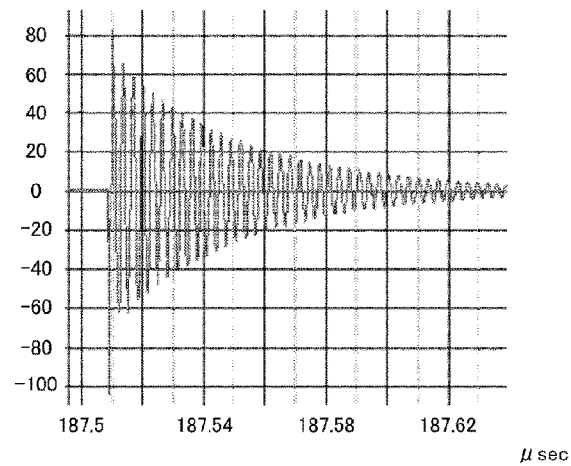
FIG. 5A is a graph illustrating the waveform of pulse voltage.
Figure 5B:
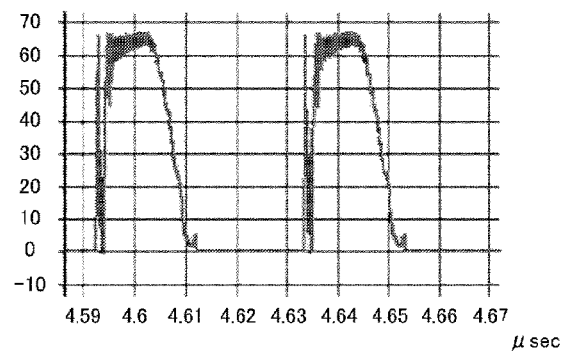
FIG. 5B is a graph illustrating the waveform of fly-back voltage.
Figure 5C:
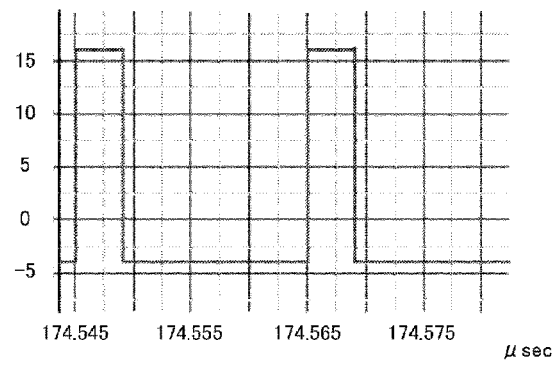
FIG. 5C is a graph illustrating the waveform of rectangular-wave voltage.

Although the input voltage to be applied to the primary winding N1 of the transformer T1 is the sine-wave alternating current voltage in the present preferred embodiment, the sine-wave alternating current voltage is not necessarily applied. The alternating-current voltage may include any waveform of the alternating current waveform. For example, the alternating-current voltage may be pulse voltage, fly-back voltage, or rectangular-wave voltage shown in FIGS. 5A to 5C, respectively. FIG. 5A is a graph illustrating the waveform of the pulse voltage, FIG. 5B is a graph illustrating the waveform of the fly-back voltage, and FIG. 5C is a graph illustrating the waveform of the rectangular-wave voltage.

Although the case in which the negative ions are likely to be generated, compared with the positive ions, is exemplified in the above description, the present preferred embodiment provides the same or similar advantages also if the positive ions are likely to be generated, compared with the negative ions.

Figure 6:
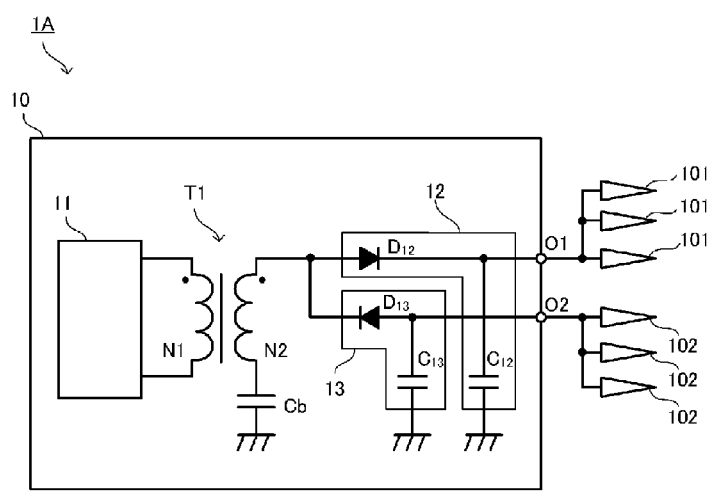
FIG. 6 is a circuit diagram of a static eliminator of another example.

FIG. 6 is a circuit diagram of a static eliminator 1A of another example. In the static eliminator 1A, multiple positive ion generators 101 are electrically connected to the positive-side output terminal O1. In addition, multiple negative ion generators 102 are electrically connected to the negative-side output terminal O2, and the positive ion current is equal or substantially equal to the negative ion current to adjust the balance of generation of the positive and negative ions.

Loads other than the positive ion generator and the negative ion generator may be electrically connected to the positive-side output terminal O1 and the negative-side output terminal O2 of the power supply unit 10.

Figure 7A:
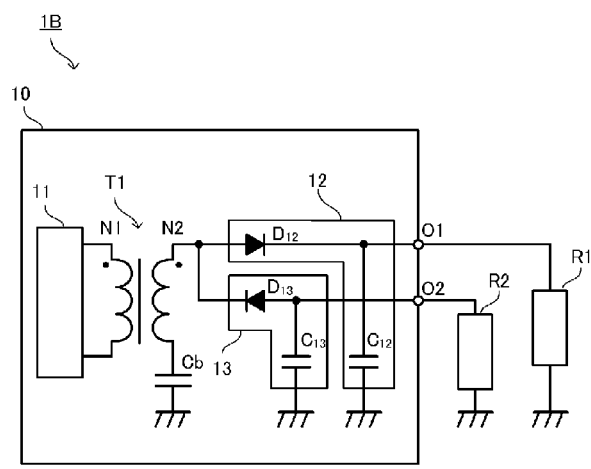
FIGS. 7A and 7B are circuit diagrams of load apparatuses each including a power supply unit.
Figure 7B:
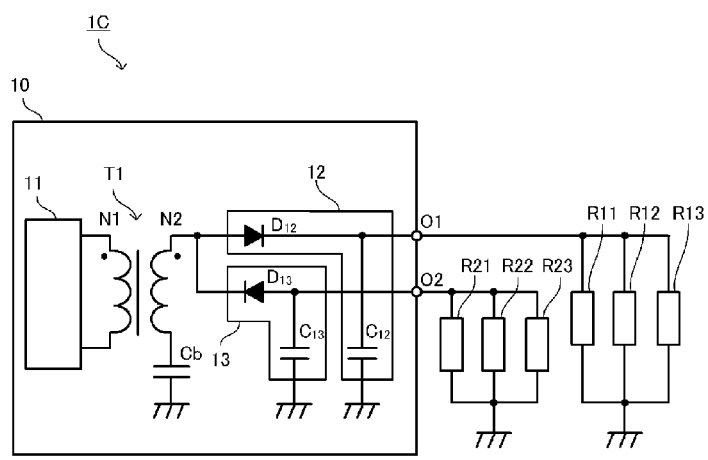

FIGS. 7A and 7B are circuit diagrams of load apparatuses including the power supply unit 10. In a load apparatus 1B shown in FIG. 7A, a load R1 is electrically connected to the positive-side output terminal O1 and a load R2 is electrically connected to the negative-side output terminal O2. In a load apparatus 1C shown in FIG. 7B, multiple loads R11, R12, R13 are electrically connected to the positive-side output terminal O1 and multiple loads R21, R22, R23 are electrically connected to the negative-side output terminal O2. Accordingly, the total amount of current flowing through the load R1 is equal or substantially equal to the total amount of current flowing through the load R2.

Although the bypass capacitor Cb that keeps the balance of generation of the positive and negative ions is provided between the secondary winding N2 of the transformer T1 and the ground in the present preferred embodiment, the position where the bypass capacitor Cb is provided is not specifically limited. The bypass capacitor Cb may be provided on a path from the node A to the ground through the secondary winding N2.

Figure 8:
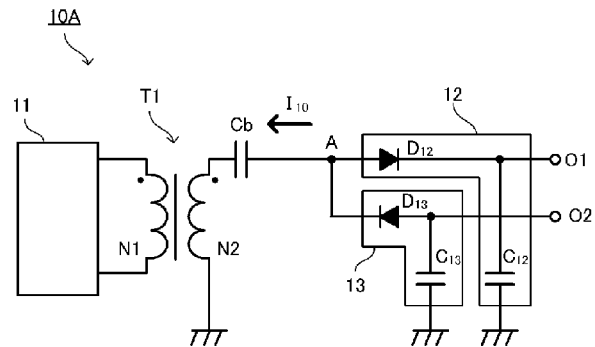
FIG. 8 is a circuit diagram of a power supply unit of another example.

FIG. 8 is a circuit diagram of a power supply unit 10A of another example. In the example shown in FIG. 8, the bypass capacitor Cb is provided between the secondary winding N2 of the transformer T1 and the node A. The positive ion generator 101 and the negative ion generator 102 or the loads R1 and R2 shown in FIG. 7A may be electrically connected to the positive-side output terminal O1 and the negative-side output terminal O2, respectively, in the power supply unit 10A. Multiple positive ion generators 101 and so on may be electrically connected. The increase in charging voltage of the bypass capacitor Cb sets the total amount of current flowing from the positive-side output terminal O1 to be equal or substantially equal to the total amount of current flowing from the negative-side output terminal O2. If the positive ion generator and the negative ion generator are electrically connected to the positive-side output terminal O1 and the negative-side output terminal O2, respectively, the static eliminator is able to provide a desirable balance of generation of the positive and negative ions.

Figure 9:
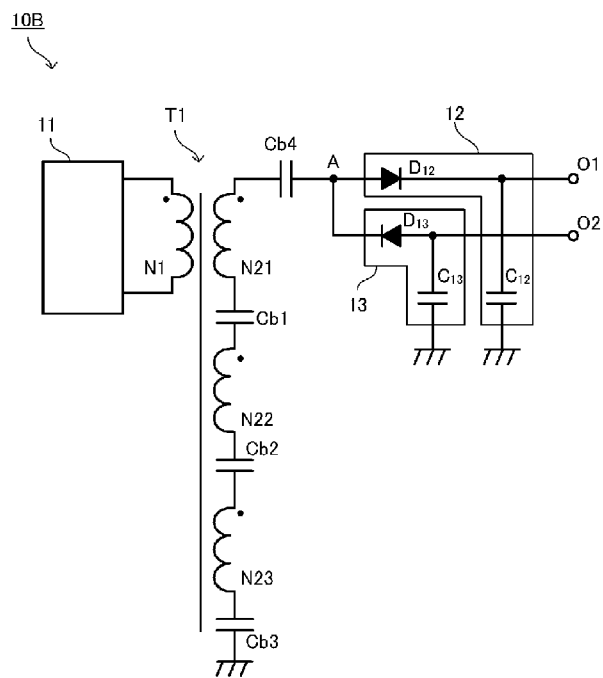
FIG. 9 is a circuit diagram of a power supply unit of another example.

FIG. 9 is a circuit diagram of a power supply unit 10B of another example.

In the example shown in FIG. 9, a circuit is provided in which multiple windings N21, N22, and N23 are electrically connected in series to each other as the secondary winding N2 of the transformer T1. In addition, multiple bypass capacitors Cb1, Cb2, Cb3, and Cb4 are provided at the secondary side of the transformer T1. The bypass capacitor Cb1 is provided between the windings N21 and N22. The bypass capacitor Cb2 is provided between the windings N22 and N23. The bypass capacitor Cb3 is provided between the winding N23 and the ground. The bypass capacitor Cb4 is provided between the winding N21 and the node A. Accordingly, the division of the secondary winding of the transformer T1 into multiple windings significantly reduces the withstand voltage of each winding. Although the three secondary windings are included in the present preferred embodiment, any number of secondary windings may be included. Preferably, at least one bypass capacitor to be provided between the ground and the node A.

Second Preferred Embodiment

Figure 10A:
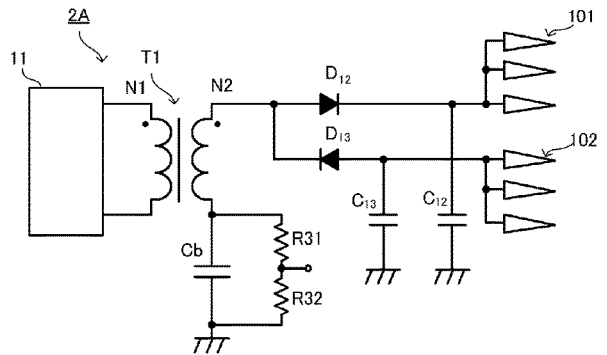
FIGS. 10A to 10C are circuit diagrams of static eliminators according to a second preferred embodiment of the present invention.
Figure 10B:
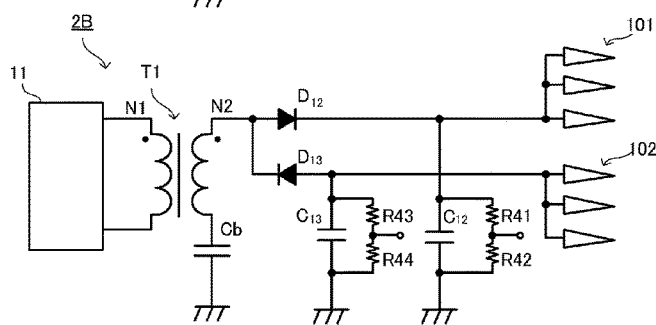
Figure 10C:
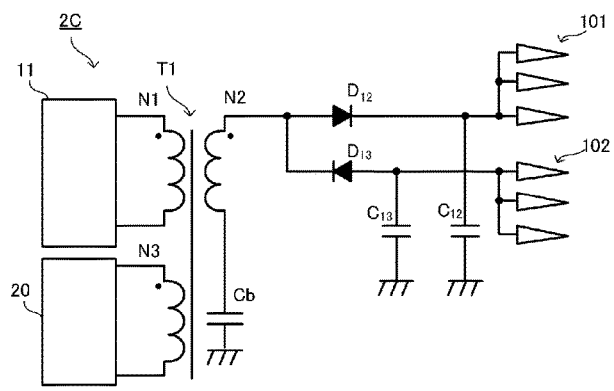

FIGS. 10A to 10C are circuit diagrams of static eliminators 2A, 2B, and 2C, respectively, according to a second preferred embodiment of the present invention. The static eliminators 2A and 2B each include a resistive voltage divider circuit that detects output voltage.

In the case of the static eliminator 2A shown in FIG. 10A, a series circuit of resistor dividers R31 and R32 is electrically connected in parallel to the bypass capacitor Cb. The series circuit of the resistor dividers R31 and R32 enables detection of the voltage of the bypass capacitor Cb. If the voltage between both ends of the resistor divider R32 is denoted by Vm, the voltage Vb of the bypass capacitor Cb is represented by Vb≈(R31+R32)/R32*Vm. Accordingly, the voltage between both ends of the bypass capacitor Cb is able to be measured at low voltage.

When the input voltage is denoted by V1, the voltage generated at the secondary side of the transformer T1 is denoted by V2, the number of turns of the primary winding N1 is denoted by N1, and the number of turns of the secondary winding N2 is denoted by N2, V2=N2/N1*V1. Positive voltage V(+) to be applied to the positive ion generator 101 is V(+)=V2/2+Vb. Negative voltage V(−) to be applied to the negative ion generator 102 is V(−)=V2/2−Vb. From this relationship, a normal voltage range is able to be estimated and, if the voltage range exceeds the normal voltage range, any abnormal condition of the static eliminator 2A is able to be detected. The abnormal condition is, for example, corrosion of the positive ion generator 101 or the negative ion generator 102 or adhesion of dirt to the positive ion generator 101 or the negative ion generator 102. The series circuit of the resistor dividers R31 and R32 is an example of a "first resistive voltage divider circuit".

In the case of the static eliminator 2B shown in FIG. 10B, a series circuit of resistor dividers R41 and R42 is electrically connected in parallel to the smoothing capacitor $C_{12}$ and a series circuit of resistor dividers R43 and R44 is electrically connected in parallel to the smoothing capacitor $C_{13}$. When the voltage between both ends of the resistor divider R42 is denoted by Vm1, the positive voltage V(+) is represented by V(+)≈(R41+R42)/R42*Vm1. When the voltage between both ends of the resistor divider R44 is denoted by Vm2, the negative voltage V(−) is represented by V(−)≈(R43+R44)/R44*Vm2. From this relationship, any abnormal condition or the like of the static eliminator 2B is able to be detected, as in FIG. 10A. The series circuit of the resistor dividers R41 and R42 is an example of a "second resistive voltage divider circuit". The series circuit of the resistor dividers R43 and R44 is an example of a "third resistive voltage divider circuit".

The static eliminator 2B may include one of the series circuit of R41 and R42 and the series circuit of the resistor dividers R43 and R44. In this case, for example, if the positive voltage V(+) is detected, the negative voltage V(−) is calculated by V(−)=V2−V(+).

In the case of the static eliminator 2C shown in FIG. 10C, the transformer T1 further includes a tertiary winding N3. A detection circuit 20 is electrically connected to the tertiary winding N3. Detection of voltage V3 generated at the tertiary winding N3 with the detection circuit 20 enables detection of the voltage V2 of the secondary winding N2. When the number of turns of the tertiary winding N3 is denoted by N3, V3=N3/N2*V2. The voltage V2 of the secondary winding N2 is detected from this equation. From this relationship, the output voltage from the static eliminator 2C is able to be monitored or an output error is able to be detected, as in FIG. 10A.

Third Preferred Embodiment

Figure 11:
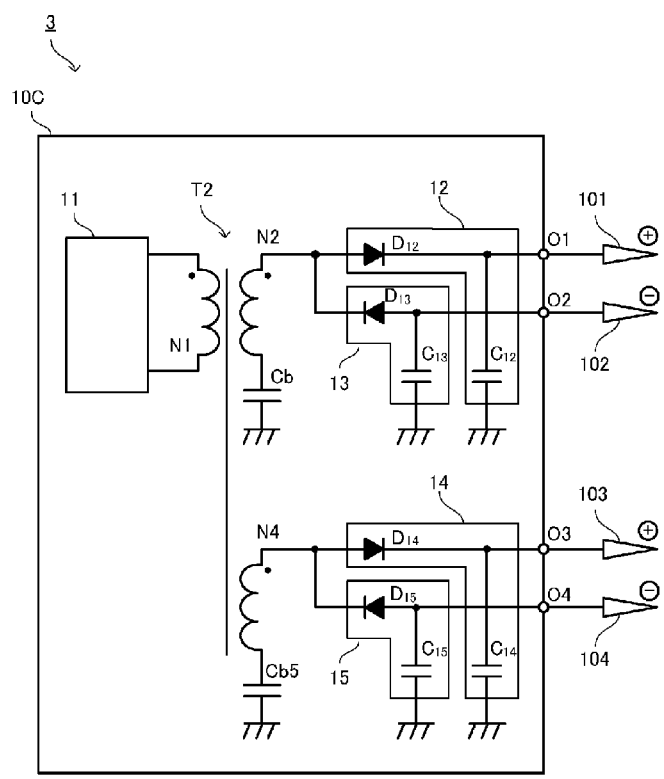
FIG. 11 is a circuit diagram of a static eliminator according to a third preferred embodiment of the present invention.

FIG. 11 is a circuit diagram of a static eliminator 3 according to a third preferred embodiment of the present invention.

The static eliminator 3 includes a power supply unit 10C. The power supply unit 10C includes two positive-side output terminals O1 and O3 and two negative-side output terminals O2 and O4. Positive ion generators 101 and 103 are electrically connected to the positive-side output terminals O1 and O3, respectively, and negative ion generators 102 and 104 are electrically connected to the negative-side output terminals O2 and O4, respectively. Multiple positive ion generators 101 and 103 may be electrically connected to the positive-side output terminals O1 and O3, respectively, and multiple negative ion generators 102 and 104 may be electrically connected to the negative-side output terminals O2 and O4, respectively.

The power supply unit 10C includes the driving circuit 11, a transformer T2, positive-side rectification circuits 12 and 14, and negative-side rectification circuits 13 and 15. The positive-side rectification circuit 14 includes circuitry similar to that of the positive-side rectification circuit 12 and includes a diode $D_{14}$ and a smoothing capacitor $C_{14}$. The negative-side rectification circuit 15 includes circuitry similar to that of the negative-side rectification circuit 13 and includes a diode $D_{15}$ and a smoothing capacitor $C_{15}$.

The transformer T2 includes the primary winding N1 and secondary windings N2 and N4. The primary winding N1 is electrically connected to the driving circuit 11. A first end of the secondary winding N2 is electrically connected to the ground via the bypass capacitor Cb and a second end of the secondary winding N2 is electrically connected to the positive-side output terminal O1 and the negative-side output terminal O2 via the positive-side rectification circuit 12 and the negative-side rectification circuit 13, respectively. A first end of the secondary winding N4 is electrically connected to the ground via a bypass capacitor Cb5 and a second end of the secondary winding N4 is electrically connected to the positive-side output terminal O3 and the negative-side output terminal O4 via the positive-side rectification circuit 14 and the negative-side rectification circuit 15, respectively. Although two pairs a pair of the secondary winding and the positive-side rectification circuit 12 and the negative-side rectification circuit 13, which are electrically connected to the secondary winding, and a pair of the secondary winding and the positive-side rectification circuit 14 and the negative-side rectification circuit 15, which are electrically connected to the secondary winding, are shown in FIG. 11, any number of pairs may be provided.

Accordingly, since the positive ion generator 101 and the negative ion generator 102 are able to be separated from the positive ion generator 103 and the negative ion generator 104, the static electricity is able to be eliminated in a wide range in the state in which the balance of generation of the positive and negative ions is maintained with one driving circuit. Differentiating the numbers of turns of the secondary windings N2 and N4 of the transformer T2 from each other differentiates the voltage to be applied to the positive and negative ion generators electrically connected to the secondary winding N2 from the voltage to be applied the positive and negative ion generators electrically connected to the secondary winding N4. Accordingly, the total amount of ions generated in the positive ion generator 101 and the negative ion generator 102 is able to be differentiated from the total amount of ions generated in the positive ion generator 103 and the negative ion generator 104 depending on the objective and the application.

Fourth Preferred Embodiment

Figure 12:
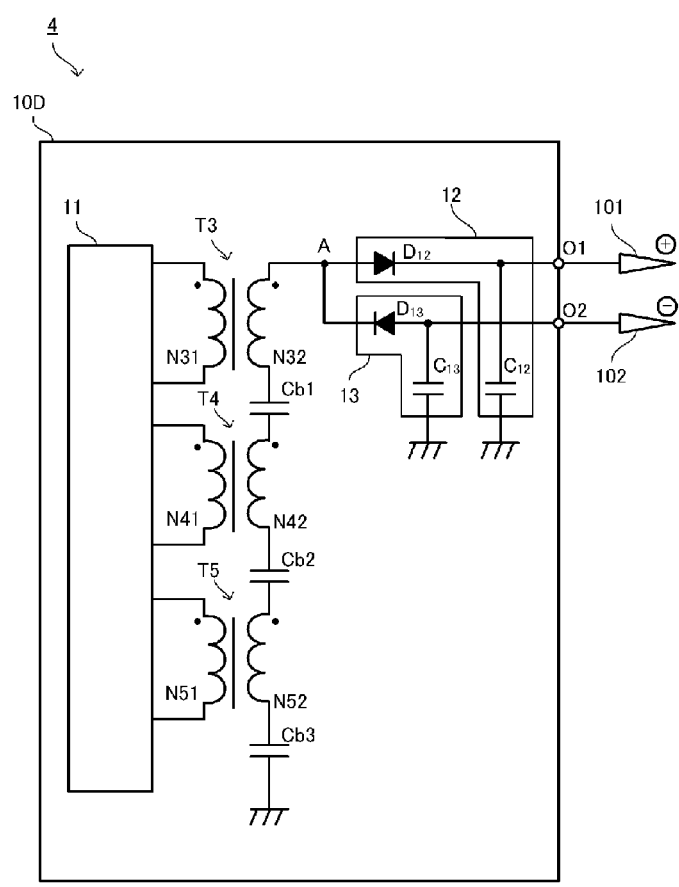
FIG. 12 is a circuit diagram of a static eliminator according to a fourth preferred embodiment of the present invention.

FIG. 12 is a circuit diagram of a static eliminator 4 according to a fourth preferred embodiment of the present invention.

A power supply unit 10D in the static eliminator 4 includes transformers T3, T4, and T5. The transformers T3, T4, and T5 includes primary windings N31, N41, and N51 and secondary windings N32, N42, and N52, respectively. The secondary windings N32, N42, and N52 are electrically connected in series to each other. A bypass capacitor Cb1 is provided between the secondary windings N32 and N42. A bypass capacitor Cb2 is provided between the secondary windings N42 and N52. A bypass capacitor Cb3 is provided between the secondary winding N52 and the ground. Although the three transformers are provided in the example shown in FIG. 12, any number of transformers may be provided.

Accordingly, the withstanding voltage performance is significantly improved by providing multiple transformers and the output voltage is able to be shared between the respective windings by connecting the secondary windings N32, N42, and N52 of the transformers to each other in series.

Fifth Preferred Embodiment

Figure 13:
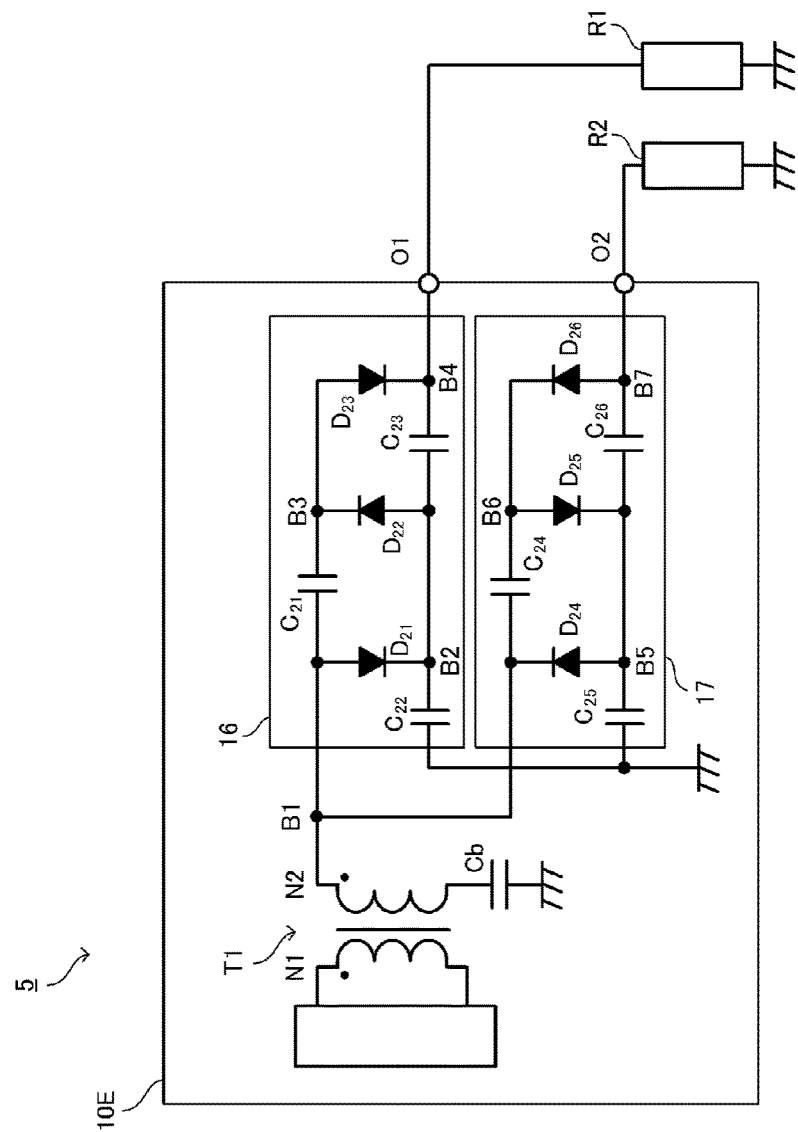
FIG. 13 is a circuit diagram of a load apparatus including a power supply unit, according to a fifth preferred embodiment of the present invention.

FIG. 13 is a circuit diagram of a load apparatus 5 including a power supply unit 10E, according to a fifth preferred embodiment of the present invention.

The power supply unit 10E includes a positive-side rectification circuit 16 and a negative-side rectification circuit 17. A second end of the secondary winding N2 is electrically connected to the positive-side output terminal O1 and the negative-side output terminal O2 via the positive-side rectification circuit 16 and the negative-side rectification circuit 17, respectively. The node between the positive-side rectification circuit 16 and the negative-side rectification circuit 17, and the secondary winding N2 is referred to as a node B1.

The positive-side rectification circuit 16 is a three-stage Cockcroft circuit including capacitors $C_{21}$, $C_{22}$, and $C_{23}$ and diodes $D_{21}$, $D_{22}$, and $D_{23}$. The positive-side rectification circuit 16 is an example of the "first rectification circuit". The diode $D_{21}$ is an example of the "first diode".

The negative-side rectification circuit 17 is a three-stage Cockcroft circuit including capacitors $C_{24}$, $C_{25}$, and $C_{26}$ and diodes $D_{24}$, $D_{25}$, and $D_{26}$. The negative-side rectification circuit 17 is an example of the "second rectification circuit". The diode $D_{24}$ is an example of the "second diode".

In the power supply unit 10E, when the voltage generated at the secondary side of the transformer T1 is denoted by V2 and the voltage of the bypass capacitor Cb is denoted by Vb, the maximum voltage at the node B1 is V2/2+Vb and the minimum voltage at the node B1 is −V2/2+Vb.

In the positive-side rectification circuit 16, the diode $D_{21}$ rectifies the maximum voltage at the node B1. Accordingly, the voltage at the cathode side (B2) of the diode $D_{21}$ is V2/2+Vb. The charging voltage of the capacitor $C_{21}$ is equal or substantially equal to the difference between the voltage at the node B2 and the minimum voltage at the node B1, that is, (V2/2+Vb)−(−V2/2+Vb)=V2. Accordingly, the maximum voltage at a node B3 between the capacitor $C_{21}$ and the diode $D_{22}$ is V2/2+Vb+V2=3×V2/2+Vb. Voltage of a node B4 between the capacitor $C_{23}$ and the diode $D_{23}$ is the voltage resulting from rectification of the maximum voltage at the node B3, that is, 3×V2/2+Vb.

The charging voltage of the capacitor $C_{22}$ is the absolute value of the maximum voltage at the node B1 |V2/2+Vb|. The charging voltage of the capacitors $C_{21}$ and $C_{23}$ is V2.

In the negative-side rectification circuit 17, the diode $D_{24}$ rectifies the minimum voltage at the node B1. Accordingly, the voltage at the anode side (B5) of the diode $D_{24}$ is −V2/2+Vb. The charging voltage of the capacitor $C_{24}$ is equal or substantially equal to the difference between the minimum voltage at the node B1 and the maximum voltage at the node B5, that is, (−V2/2+Vb)−(V2/2+Vb)=−V2. Accordingly, the minimum voltage at a node B6 between the capacitor $C_{24}$ and the diode $D_{26}$ is −V2/2+Vb−V2=−3×V2/2+Vb. Voltage of a node B7 between the capacitor $C_{26}$ and the diode $D_{26}$ is the voltage resulting from rectification of the minimum voltage at the node B6, that is, −3×V2/2+Vb.

The charging voltage of the capacitor $C_{25}$ is the absolute value of the minimum voltage at the node B1 |−V2/2+Vb|. The charging voltage of the capacitors $C_{24}$ and $C_{26}$ is −V2. Specifically, the positive voltage V(+) to be applied to R1 is V(+)=3×V2/2+Vb. The negative voltage V(−) to be applied to R2 is V(−)=−3×V2/2+Vb.

If the bypass capacitor Cb is not charged, Vb=0 and the voltage at the node B4 is 3V2/2 and the voltage at the node B7 is −3V2/2. Here, if the load R1 electrically connected to the positive-side output terminal O1 is different from the load R2 electrically connected to the negative-side output terminal O2, the output currents are different from each other.

For example, if the load R1 electrically connected to the positive-side output terminal O1 is small, that is, if it is difficult to flow current through the positive-side rectification circuit 16, the sum of the currents flowing from the node B1 into the positive-side rectification circuit 16 and the negative-side rectification circuit 17 is negative. This negative current is supplied from the bypass capacitor Cb via the secondary winding N2 and the node B1.

When the amount of charge flowing into the bypass capacitor Cb is denoted by ΔQ, the voltage of the bypass capacitor Cb is increased by an amount corresponding to ΔV=ΔQ/Cb, where Cb indicates the capacitance of the bypass capacitor Cb. In the positive-side rectification circuit 16, the voltage between both ends of the capacitor $C_{22}$ is also increased by the amount corresponding to ΔV and the voltage at the node B4 is also increased by the amount corresponding to ΔV. In the negative-side rectification circuit 17, the voltage between both ends of the capacitor $C_{25}$ is decreased by the amount corresponding to ΔV and the voltage at the node B7 is also decreased by the amount corresponding to ΔV. Finally, the voltage of the bypass capacitor Cb is converged so that the positive current is equal or substantially equal to the negative current.

As described above, the bypass capacitor Cb and the capacitors $C_{22}$ and $C_{25}$ set the positive current to be equal or substantially equal to the negative current. Although each of the positive-side rectification circuit 16 and the negative-side rectification circuit 17 is a three-stage Cockcroft circuit in the present preferred embodiment, the positive current is able to be equal or substantially equal to the negative current if the number of stages of the Cockcroft circuit is varied. Although the loads R1 and R2 are, for example, the positive ion generators or the likes, the loads R1 and R2 are not limited to the positive ion generators or the likes. The loads R1 and R2 may be other loads.

Sixth Preferred Embodiment

Figure 14:
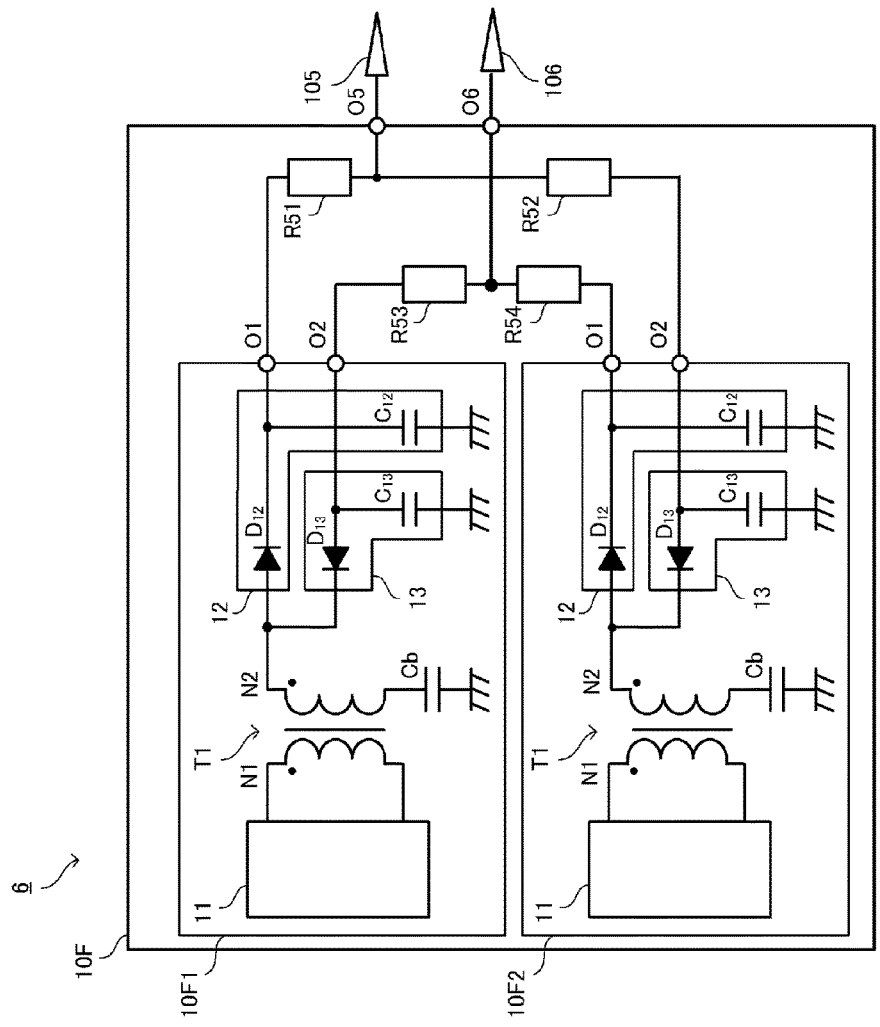
FIG. 14 is a circuit diagram of a static eliminator including a power supply unit, according to a sixth preferred embodiment of the present invention.

FIG. 14 is a diagram illustrating a static eliminator 6 including a power supply unit 10F, according to the present preferred embodiment of the present invention.

The power supply unit 10F includes two power supply units 10F1 and 10F2. Since the power supply units 10F1 and 10F2 include the same or similar circuitry as the power supply unit 10 described above in the first preferred embodiment, the same reference numerals are given to the components composing the power supply units 10F1 and 10F2. The power supply unit 10F1 is an example of a "first positive and negative output circuit". The power supply unit 10F2 is an example of a "second positive and negative output circuit".

The cathode of the diode $D_{12}$ in the power supply unit 10F1 is electrically connected to the anode of the diode $D_{13}$ in the power supply unit 10F2 via resistors R51 and R52 to significantly reduce or prevent the occurrence of a short-circuit. A node between the resistors R51 and R52 is electrically connected to an output terminal O5. An ion generator 105 is electrically connected to the output terminal O5. The output terminal O5 is an example of a "first positive and negative output terminal". The resistors R51 and R52 are examples of a "first resistor" and a "second resistor".

The anode of the diode $D_{13}$ in the power supply unit 10F1 is electrically connected to the cathode of the diode $D_{12}$ in the power supply unit 10F2 via resistors R53 and R54 to significantly reduce or prevent the occurrence of a short-circuit. A node between the resistors R53 and R54 is electrically connected to an output terminal O6. An ion generator 106 is electrically connected to the output terminal O6. The output terminal O6 is an example of a "second positive and negative output terminal". The resistors R53 and R54 are examples of a "third resistor" and a "fourth resistor".

The power supply units 10F1 and 10F2 are alternately operated. Accordingly, one ion generator alternately discharges the positive and negative ions.

Figure 15A:
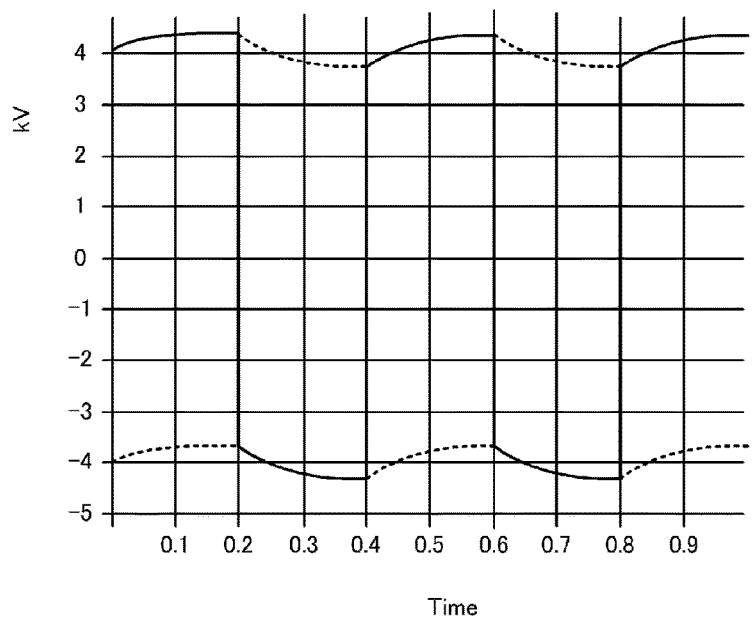
FIG. 15A is a graph illustrating the waveforms of voltage to be applied to ion generators and FIG. 15B is a graph illustrating the waveforms of current flowing into the ion generators.
Figure 15B:
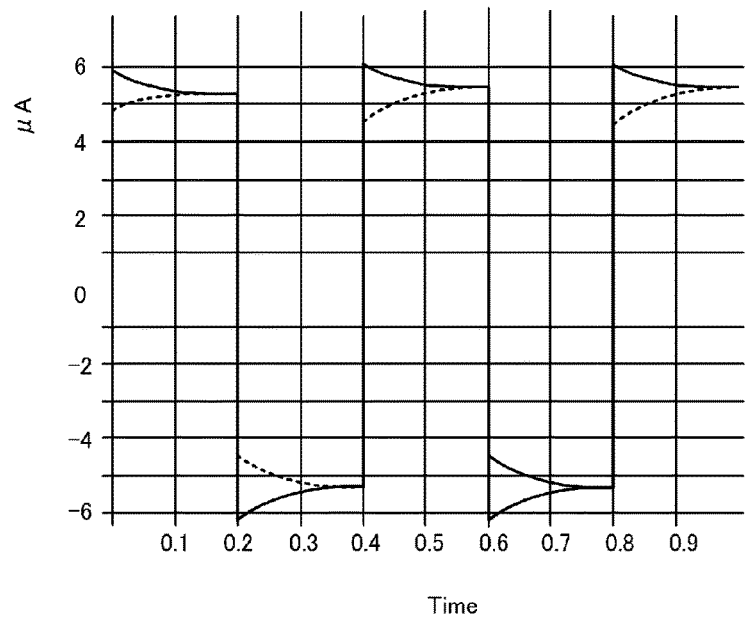

FIG. 15A is a graph illustrating the waveform of voltage to be applied to the ion generator 105 and the waveform of voltage to be applied to the ion generator 106 and FIG. 15B is a graph illustrating the waveform of current flowing into the ion generator 105 and the waveform of current flowing into the ion generator 106.

Referring to FIG. 15A, a solid-line waveform is the waveform of the voltage to be applied to the ion generator 105 and a dotted-line waveform is the waveform of the voltage to be applied to the ion generator 106. Referring to FIG. 15B, a solid-line waveform is the waveform of the current flowing into the ion generator 105 and a dotted-line waveform is the waveform of the current flowing into the ion generator 106. In the dotted-line waveform in FIG. 15B, the positive and negative sides are inverted in accordance with the direction of the current flowing into the ion generator 105.

For example, if the power supply unit 10F1 is operated with a cycle of about 0 seconds to about 0.2 seconds, the positive current flows into the ion generator 105 via the resistor R51. The positive ions are generated from the ion generator 105. The negative current flows into the ion generator 106 via the resistor R53. The negative ions are generated from the ion generator 106. At this time, the positive and negative ions are discharged in the state in which the balance of generation of the positive and negative ions is maintained, as described in the first preferred embodiment. The positive current flowing into the negative-side output terminal O2 of the power supply unit 10F2 via the resistors R51 and R52 flows into the negative-side output terminal O2 of the power supply unit 10F1 via the diode $D_{13}$ and the diode $D_{12}$ in the power supply unit 10F2 and the resistors R54 and R53. Since the positive current flowing into the negative-side output terminal O2 is equivalent to the negative current flowing out of the negative-side output terminal O2 of the power supply unit 10F1, the balances between all the positive and negative currents and between the positive and negative ion currents are maintained.

If the power supply unit 10F2 is operated with a cycle of about 0 seconds to about 0.2 seconds, the negative current flows into the ion generator 105 via the resistor R52. The negative ions are generated from the ion generator 105. The positive current flows into the ion generator 106 via the resistor R54. The positive ions are generated from the ion generator 106. At this time, the positive and negative ions are discharged in the state in which the balance of generation of the positive and negative ions is maintained. Also in this case, the positive current flowing from the positive-side output terminal O1 of the power supply unit 10F2 into the power supply unit 10F1 via the resistors R54 and R53 is equal or substantially equal to the negative current flowing from the negative-side output terminal O2 of the power supply unit 10F2 into the power supply unit 10F1 via the loads R52 and R51, thus maintaining the balances between all the positive and negative currents and between the positive and negative ion currents.

As described above, the ion generator 105 alternately generates the positive and negative ions. The ion generator 106 also alternately generates the positive and negative ions. In other words, the positive and negative ions are alternately generated from one ion generator. If the positive ions are constantly or substantially constantly discharged from the ion generator, there is a problem in that the ion generator is abraded due to collision of molecules. If the negative ions are constantly or substantially constantly discharged from the ion generator, there is also a problem in that siloxane adheres to the ion generator. If the positive or negative ions are constantly or substantially constantly discharged from the ion generator, there is a problem in that the balance of the positive and negative ions is disturbed near the ion element.

Accordingly, inverting the polarity of the ion generator enables the balance of the ions to be maintained near the ion element. In addition, since the collision time of molecules if the positive ions are generated is significantly reduced, the abrasion of the ion element is able to be significantly reduced. Similarly, since the time to generate the negative ions is significantly reduced, the adhesion time of siloxane is also able to be significantly reduced. In addition, the collision of the molecules to the element if the positive ions are generated enables removal of siloxane. As a result, the above problems are resolved, thus providing an increase of the lifetime of the ion generator.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A power supply unit comprising:
   a transformer including a primary winding that receives an alternating-current voltage and a secondary winding including a first end that is electrically connected to ground;
   a first rectification circuit including a first diode that is electrically connected to a second end of the secondary winding, an anode of which is electrically connected to the second end, and a cathode of which is electrically connected to a positive-side output terminal;
   a second rectification circuit including a second diode that is electrically connected to the second end of the secondary winding, a cathode of which is electrically connected to the second end, and an anode of which is electrically connected to a negative-side output terminal; and
   a capacitor connected in series on a path extending from a node between the second end of the secondary winding and the first rectification circuit and the second rectification circuit to the ground through the secondary winding.

2. The power supply unit according to claim 1, wherein the capacitor is provided between the secondary winding and the ground.

3. The power supply unit according to claim 1, wherein the capacitor is provided between the node and the secondary winding.

4. The power supply unit according to claim 1, further comprising:
   a first resistive voltage divider circuit electrically connected in parallel to the capacitor.

5. The power supply unit according to claim 1, wherein the first rectification circuit includes a first smoothing capacitor electrically connected between the cathode of the first diode and the ground; and
   the second rectification circuit includes a second smoothing capacitor electrically connected between the anode of the second diode and the ground.

6. The power supply unit according to claim 5, further comprising:
   a second resistive voltage divider circuit electrically connected in parallel to the first smoothing capacitor; and
   a third resistive voltage divider circuit electrically connected in parallel to the second smoothing capacitor.

7. The power supply unit according to claim 1, wherein the transformer includes a tertiary winding; and
   the power supply unit includes a detection circuit that detects voltage occurring at the tertiary winding.

8. The power supply unit according to claim 1, wherein the first rectification circuit includes a plurality of first rectification circuits and the second rectification circuit includes a plurality of second rectification circuits;
   the positive-side output terminal includes a plurality of positive-side output terminals and the negative-side output terminal includes a plurality of negative-side output terminals;
   the transformer includes a plurality of secondary windings; and
   the second end of each of the plurality of secondary windings is electrically connected to the positive-side output terminal and the negative-side output terminal via the first rectification circuit and the second rectification circuit.

9. A static eliminator comprising:
   the power supply unit according to claim 1;
   a positive ion generator electrically connected to the positive-side output terminal; and
   a negative ion generator electrically connected to the negative-side output terminal.

10. The static eliminator according to claim 9, wherein each of the positive ion generator and the negative ion generator is a needle discharge electrode.

11. The static eliminator according to claim 9, wherein the capacitor sets absolute values of currents applied to the positive ion generator and the negative ion generator to be equal or substantially equal.

12. The static eliminator according to claim 9, wherein an amount of ions generated in the positive ion generator is equal or substantially equal to an amount of ions generated in the negative ion generator.

13. A load apparatus comprising:
    the power supply unit according to claim 1;
    at least one first resistive load connected to the positive-side output terminal; and
    at least one second resistive load electrically connected to the negative-side output terminal.

14. The power supply unit according to claim 1, wherein the transformer is included in a plurality of transformers with secondary windings that are connected in series.

15. The power supply unit according to claim 14, wherein a capacitor is provided between each adjacent pair of the secondary windings of the plurality of capacitors.

16. The power supply unit according to claim 1, wherein each of the first rectification circuit and the second rectification circuit is a Cockcroft circuit.

17. A power supply unit comprising:
    a first positive and negative output circuit; and
    a second positive and negative output circuit; wherein
    each of the first positive and negative output circuit and the second positive and negative output circuit includes:
      a positive-side output terminal and a negative-side output terminal;
      a transformer including a primary winding that receives an alternating-current voltage and a secondary winding including a first end that is electrically connected to ground;
      a first rectification circuit including a first diode which is electrically connected to a second end of the secondary winding, an anode of which is electrically connected to the second end, and a cathode of which is electrically connected to the positive-side output terminal;
      a second rectification circuit including a second diode which is electrically connected to the second end of the secondary winding, a cathode of which is electrically connected to the second end, and an anode of which is electrically connected to the negative-side output terminal; and
      a capacitor provided on a path from a node between the second end of the secondary winding and the first rectification circuit and the second rectification circuit to the ground through the secondary winding;
    the positive-side output terminal of the first positive and negative output circuit is electrically connected to the negative-side output terminal of the second positive and negative output circuit via a first resistor and a second resistor;

the negative-side output terminal of the first positive and negative output circuit is electrically connected to the positive-side output terminal of the second positive and negative output circuit via a third resistor and a fourth resistor;

a node between the first resistor and the second resistor is electrically connected to a first positive and negative output terminal; and a node between the third resistor and the fourth resistor is electrically connected to a second positive and negative output terminal.

18. A static eliminator comprising:

the power supply unit according to claim 17; and ion generators electrically connected to the first positive and negative output terminal and the second positive and negative output terminal.

19. The power supply unit according to claim 17, wherein each of the first positive and negative output circuit and the second positive and negative output circuit is operated with a cycle of about 0 seconds to about 0.2 seconds.

* * * * *